UNITED STATES PATENT OFFICE.

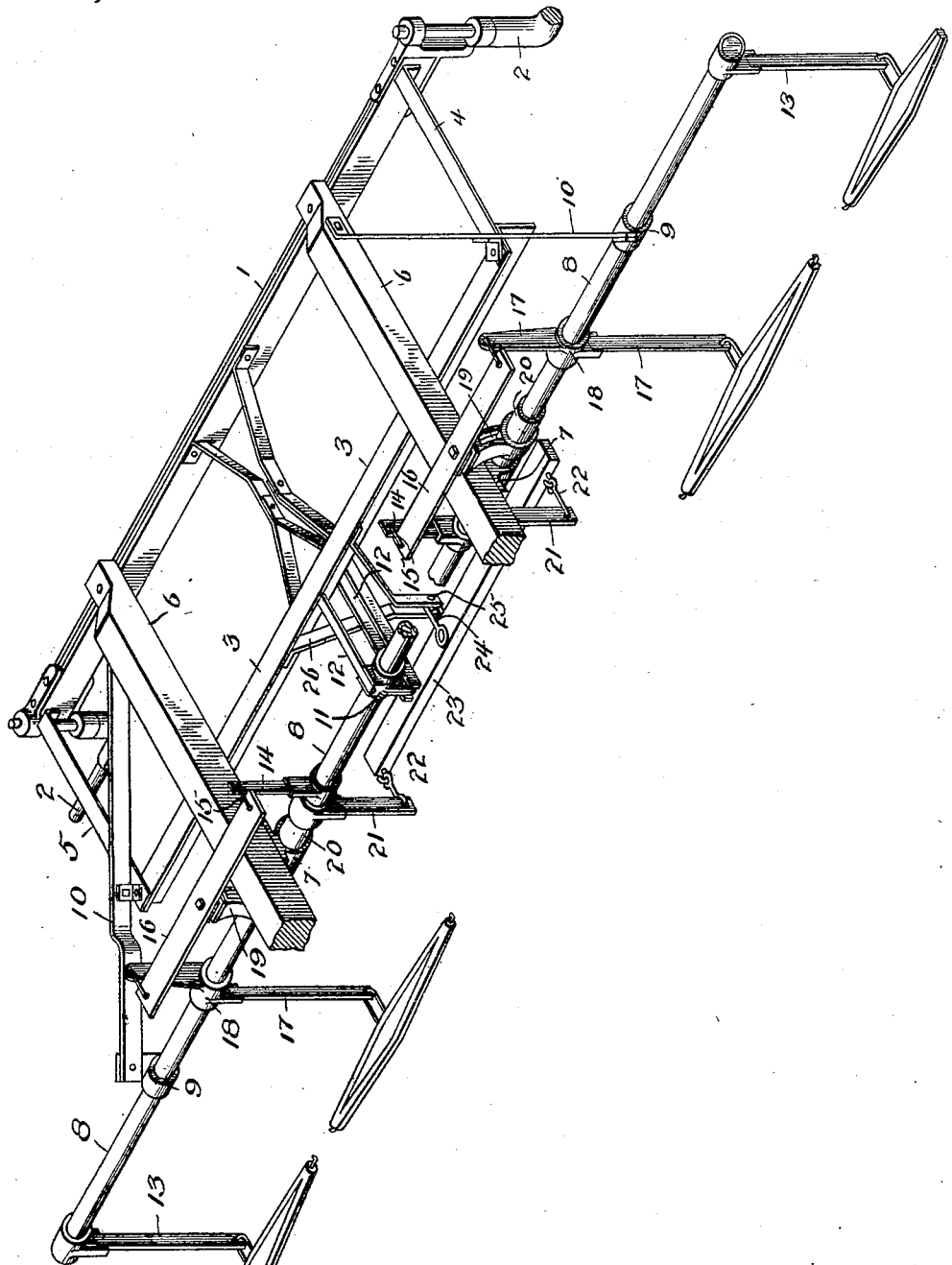

WILLIAM ELLIOTT, ROBERT H. SCHLACHTER, AND ABRAHAM LINCOLN TOLLES, OF BEATRICE, NEBRASKA, ASSIGNORS TO DEMPSTER MILL MANUFACTURING COMPANY, OF BEATRICE, NEBRASKA.

DRAFT-EQUALIZER.

979,387.

Specification of Letters Patent.

Patented Dec. 20, 1910.

Application filed May 14, 1910. Serial No. 561,477.

*To all whom it may concern:*

Be it known that we, WILLIAM ELLIOTT, ROBERT H. SCHLACHTER, and ABRAHAM LINCOLN TOLLES, citizens of the United States, residing at Beatrice, in the county of Gage and State of Nebraska, have invented certain new and useful Improvements in Draft-Equalizers, of which the following is a specification.

Our invention relates to draft-equalizers for wheel cultivators or other agricultural implements, or vehicles, and especially to devices for equalizing the draft of four horses, two on each side of the implement or vehicle.

Our invention is a modification of, and an improvement on, draft-equalizing devices heretofore patented to William Elliott and Robert H. Schlachter, said patents being numbered 947,893 and 947,894, and dated February 1, 1910. The present improvement contemplates the same general objects set forth in said patents, and particularly the prevention of "neck-weight," or the bearing down of the weight of the tongues, and the parts of the machine carried or supported by the tongues, upon the necks of the draft animals.

A special peculiarity of our invention is the use of a rotatable draw-bar or shaft, upon each side of the implement, and the equalization of the draft is effected by applying the traction power to said shafts, and distributing such power by means of suitably arranged levers, equalizer-bars, eveners, etc., in such a manner that the draft of the two horses on one side of the implement will be equalized with that of the two on the opposite side.

The accompanying drawing is a perspective view of a cultivator, or other implement, provided with an equalizing device according to our invention, the parts of the machine not immediately involved in our improvements being omitted.

The numeral 1 indicates the main sill or axle of the machine, to the ends of which the cranked axles 2 are pivoted.

3, 4 and 5 are members of the main frame, said parts being preferably of flat bar or angle iron. The tongues 6 project forward from the frame, being firmly secured thereto, and practically forming a part thereof. On said tongues are secured the hangers 7, which form bearings for the shafts, or draw-bars, 8, which extend in line across the front of the implement. Additional bearings for said shafts 8 are the loose sleeves 9, carried by diagonal braces 10, which extend outward from the frame. Said shafts 8 are also supported centrally by the sleeve 11, which receives the inner end of each shaft, and is itself rigidly supported by arms, or braces, 12, which extend forwardly from the frame.

The shafts 8 carry at their outer ends rigidly attached, downwardly projecting draft-bars 13, provided with swingle-trees at their lower ends. Said shafts also carry, at points preferably inside of and near the tongues, upwardly projecting and rigidly attached radial arms 14, said arms being connected by links 15 with equalizer-bars 16. The opposite, or outer, ends of said equalizer-bars are linked in a similar manner to the upper ends of substantially vertical draft-levers 17, secured to loose sleeves 18, on shafts 8, so as to be capable of a rocking movement on said shafts.

The equalizer-bars 16 are pivoted centrally to brackets 19, which extend upwardly from loose sleeves 20, on shafts 8, to which sleeves said brackets are rigidly attached. Said sleeves 20 inclose the shafts 8, having a rotary movement thereon, and they preferably extend through the hangers 7, and carry, at their inner ends, inside the tongues 6, rigidly attached, downwardly extending arms 21. The lower ends of said arms 21 are flexibly connected, by links 22, or otherwise, to the opposite ends of an evener-bar 23. Said evener 23 is pivoted centrally to a clevis 24 which engages a bolt 25 in the lower end of a depending bracket 26 rigidly secured to the main frame of the implement.

In operation it is evident that when traction is applied to the draft-bars 13 and the draft-levers 17 the pull on bars 13 will tend to cause partial rotation of shafts 8, and to carry radial arms 14 backward, drawing after them the inner ends of equalizer-bars 16. At the same time the traction on draft-levers 17 will tend to carry backward the outer ends of equalizer-bars 16; so that the draft of the two horses attached to 13 and 17, upon each side of the machine, will be equalized, as between said two horses, by the operation of equalizer-bars 16.

It will also be seen that the power of the pair of horses on each side of the implement, being transmitted through equalizer-bars 16, brackets 19, sleeves 20, pendent arms 21, and links 22, to the corresponding ends of the central evener-bar 23, will be equalized with the power of the pair of horses on the opposite side.

The relief of the draft animals in this implement from neck-weight results from applying the traction at low down points, thus providing an uplift to counteract the pressure of the tongues.

The respective proportions and dimensions of all the parts described will be such as to secure the proper action and result. Various changes may be made in the details of our device, in the position, arrangement, and adjustment of the parts, without departing from the essential principle and spirit of our invention, and we therefore do not limit our claims to the precise details shown and described.

Having described our invention, we claim as new and desire to secure by Letters Patent:

1. In a four horse equalizer for implements or vehicles, the combination of a main frame, a rotatable shaft mounted transversely on each side of the implement, a loose sleeve on each shaft, a bracket extending outward from each sleeve, an equalizer-bar pivoted to each bracket, means attached to said shafts and connected with said equalizer-bars for equalizing the draft of the two horses on each side, a rigid arm extending outward from each sleeve, an evener pivoted centrally to the frame, and flexible connections between said arms and said evener.

2. In a wheeled cultivator or other agricultural implement, or vehicle, in combination with a main frame, a draft equalizer comprising rotatable shafts or draw-bars mounted transversely on each side of the implement, a pendent draft-bar and an extending radial arm, both rigidly secured to each of said shafts, a draft-lever between the draft-bar and radial arm on each shaft, mounted to rock on said shaft, a loose sleeve on each shaft, between the radial arm and draft-lever, an extending bracket rigid with each of said sleeves, an equalizer-bar pivoted on each bracket, flexible connections between the ends of said equalizer-bars and said radial arms and draft-levers, pendent arms carried by said sleeves, an evener pivoted centrally to the frame, and flexible connections between said pendent arms and the ends of said evener.

In testimony whereof we affix our signatures in presence of two witnesses.

WILLIAM ELLIOTT.
ROBERT H. SCHLACHTER.
A. LINCOLN TOLLES.

Witnesses:
HERMAN LOELER,
D. MARRE.